United States Patent [19]
Wunsch

[11] 3,921,505
[45] Nov. 25, 1975

[54] CYLINDER CONSTRUCTION

[75] Inventor: Richard Wunsch, Winnipeg, Canada

[73] Assignee: Samuel McKee, Winnepeg, Canada

[22] Filed: June 10, 1974

[21] Appl. No.: 477,925

[52] U.S. Cl. .................................. 92/169; 403/341
[51] Int. Cl.[2] ...................... F16J 13/04; F16J 11/02
[58] Field of Search ...... 92/169, 170, 171; 403/309, 403/310, 313, 341

[56] References Cited
UNITED STATES PATENTS

| | | | |
|---|---|---|---|
| 2,451,089 | 10/1948 | Hunter | 92/169 |
| 2,674,988 | 4/1954 | Evans et al. | 92/169 |
| 2,865,693 | 12/1958 | Barnhart | 92/169 |
| 3,202,063 | 8/1965 | Bissell et al. | 92/169 |

FOREIGN PATENTS OR APPLICATIONS

| | | | |
|---|---|---|---|
| 511,690 | 6/1952 | Belgium | 92/171 |

Primary Examiner—Paul E. Maslousky
Attorney, Agent, or Firm—Stanley G. Ade

[57] ABSTRACT

A cylinder is provided with end portions which engage within the ends of a hollow cylinder and has seals between the shoulder and the inner surface of the cylinder. Ports are provided within the end portion and these end portions can be rotated independently through 360° so that the ports can be positioned as dictated by the location of the cylinder assembly. Split collets engage peripheral grooves in the outer walls of the end portions and adjacent the ends of the cylinder and a retainer ring or sleeve is frictionally engaged over the end portion and the collets thus holding the collets in position.

1 Claim, 7 Drawing Figures

CYLINDER CONSTRUCTION

BACKGROUND OF THE INVENTION

This invention relates to new and useful improvements in cylinder construction, particularly cylinders adapted for use in hydraulics or pneumatics or other fluids under pressure.

Conventionally such cylinders include a hollow cylinder with ends which are either welded into position, screw threadably engage the ends of the cylinder, or are held by longitudinally extending tie rods running along the length of the cylinder being bolted up upon each end.

Such structures suffer from several disadvantages. Firstly, the action of welding or screw threading often distorts the cylinders thus making accurate dimensioning of the inner surfaces impossible.

Threading and tapping of the ends of the cylinders and the ends often causes accumulative tolerances of angular and concentric runout of threading and tapping. Furthermore if tie rods are used, it is relatively easy to place different tension upon the rods thus giving uneven strain to the assembly. All of these factors can cause binding, seizing, scoring, erratic movement and eventual failure.

Furthermore ports are usually screw threaded through the wall of the cylinder and hereagain the honed dimensions of the cylinder are easily destroyed.

SUMMARY OF THE INVENTION

The present invention overcomes all of these disadvantages by providing a hollow cylinder which can be honed to required tolerances and in which the end portions are detachably secured without grooving or threading of the inside of the cylinder and without welding on any portion of the outside thereof. Furthermore no tie rods are used so that distortion or uneven tightening is eliminated.

This ensures perfect alignment of rod, piston and head with the untouched honed cylinder bore and eliminates threaded ends which can eventually loosen, welding flaws which may suddenly erupt and regular seal failures which often occur with conventional constructions.

The principal object and essence of the invention is therefore to provide a device of the character herewithin described in which a precision honed tube can be used as the cylinder and which the dimensions of the honed cylinder are not destroyed by the provision of ports or by the attachment of end portions by conventional means.

Another object of the invention is to provide a device of the character herewithin described in which the ports may be provided in the end portions and which furtheremore provides means whereby these end portions can be rotated independently through 360°thus permitting the installation of the cylinders in locations whereby the ports can be directed to the most satisfactory position for the attachment of the associated hoses.

Still another object of the invention is to provide a device of the character herewithin described which includes attaching means which can be readily disassembled if maintenance or replacement is required.

A still further object of the invention is to provide a device of the character herewithin described in which the ends are attached by means of split collets which span the junction between the end portions and the cylinder and in which the collets have inturned annular flanges engaging within these annular grooves. A sleeve or ring is then frictionally engaged over the collets thus holding them firmly in position and preventing the ends from being displaced.

Still another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Proceeding therefore to describe the invention in detail, the assembly collectively designated 10 consists of a hollow central cylinder 11, the inner surface 12 of which is honed to the precise dimensions required.

Figure 1:
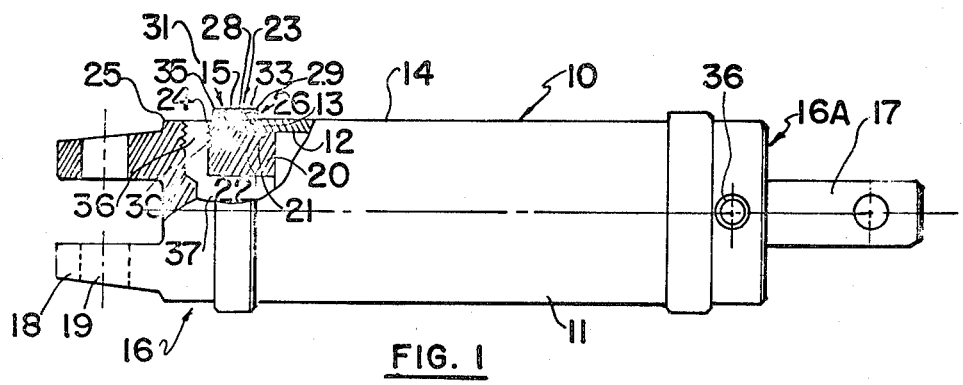
FIG. 1 is a side elevation of the cylinder assembly or construction with one end broken away in part to show the interior thereof.
Figure 2:
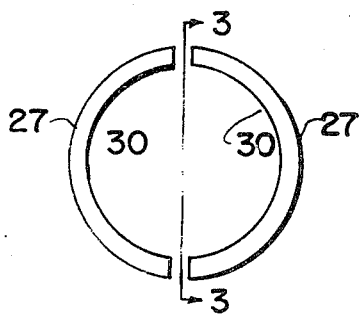
FIG. 2 is an end view of a pair of split collets per se.
Figure 4:
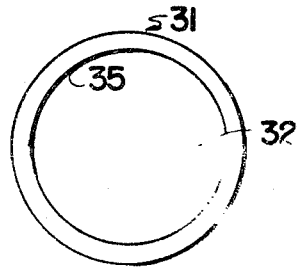
FIG. 4 is an end view of the securing sleeve.

An annular groove 13 is formed on the outer surface 14 of the cylinder 11 adjacent to but spaced inwardly from each end 15 thereof as clearly shown in FIG. 1.

An end portion is provided for each end of the central cylinder 11 and these end portions are identified by reference characters 16 and 16A respectively.

The main difference between the two ends is that end portion 16A is centrally apertured (not illustrated) to permit the conventional piston rod 17 to reciprocate therein in the usual manner.

End portion 16 is provided with spaced and parallel lug portions 18 which are apertured as at 19 and by which the cylinder may be attached to the structure in the usual manner, often with a pivotal action. However, as this is conventional, it is not believed necessary to discuss this any further.

Each end portion 16 and 16A is provided with a reduced inner shoulder 20 which is cylindrical in configuration and which is dimensioned to just slide in the end of the central cylinder 11 as clearly shown in FIG. 1 at the broken away portion thereof.

A conventional annular seal 21 engages an annular groove 22 within this reduced shoulder portion 20 and provides a fluid tight seal between the outer peripheral surface of the shoulder 20 and the inner cylindrical surface 12 of the cylinder 11.

Means are provided to detachably secure the end portions in the position shown in FIG. 1 and said means are indicated collectively by reference character 23.

Means 23 include the aforementioned annular groove 13 on the outer surface of the cylinder 11 and a further annular groove 24 formed around the outer wall of surface 25 of the end portions 16 and 16A.

Although the dimensions of grooves 13 and 24 are shown as similar in the drawings, nevertheless it will be appreciated that these could be different if desired.

A split collet assembly collectively designated 26 is provided, said collet assembly in this embodiment consisting of two semi-cylindrical collets 27. Each collet includes an annular spanning portion 28 and an inturned annular flange portion 29 and 30 and these annular inturned flanges 29 and 30 are adapted to engage the annular grooves 13 and 24 respectively when the end portion is engaged within the end of the central cylinder 11 as clearly shown in FIG. 1.

Figure 5:
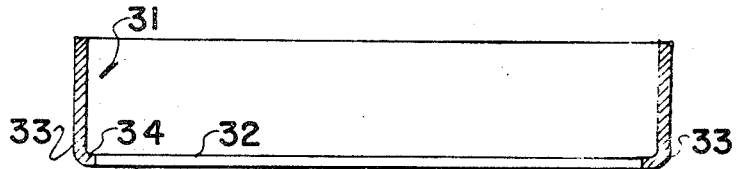
FIG. 5 is a cross sectional view of the sleeve.
Figure 6:
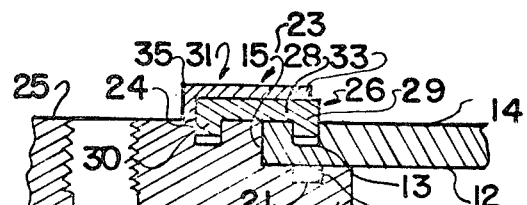
FIG. 6 is an enlarged fragmentary cross sectional view of the sectioned part of FIG. 1.

Further means are provided to detachably secure these collets in position, said further means taking the form of a sleeve collectively designated 31. This sleeve is cylindrical in configuration and is apertured as at 32 so that it may be freely engaged over the end portions 16 and 16A. The sleeve includes a collet embracing annular band or wall 33 and an inturned annular flange 34, the inner surface 35 of which defines the aperture 32 as shown in FIG. 5.

The internal dimensions of the band or wall 33 are such that it is a driving frictional fit over the collets 27 when they are engaged around the grooves as illustrated.

The inturned flange 35 abuts up against or engages the outer annular flange 30 of the collets which thus positions the sleeve so that the wall 33 covers the major portion of the collets and retains them in position.

If it is desired to remove or disassemble the structure, the sleeve 31 is hammered away from the collets which then can be disengaged from the grooves thus allowing the end portions to be pulled from the ends of the central cylinder 11.

Fluid ports 36 are formed within the end portions 16 and, if desired 16A, and communicate with the inner bore 37 of the end portions which extends through the reduced shoulder 20 and thus communicates with the interior of the central cylinder 11. Conventional hoses (not illustrated) may be attached to these ports and one of the important features of the present invention is the fact that before the sleeve 31 is hammered into position, the end portions may be rotated independently of one another so that the ports are conveniently located for the insulation within which the cylinder assembly is being used.

This prevents awkward routing of flexible hoses and is considered to be an essential feature.

Figure 3:
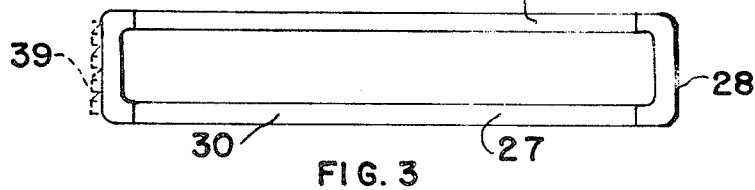
FIG. 3 is an inside plan view of one of the collets.
Figure 7:
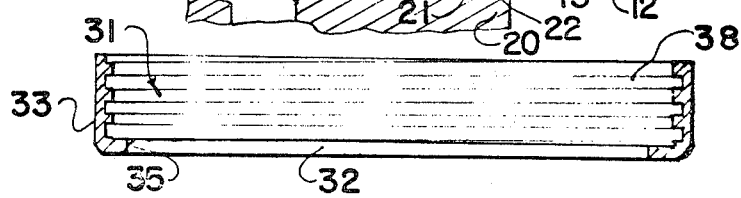
FIG. 7 is a fragmentary cross sectional view showing an alternative method of securing the sleeve.

An alternative method is provided for detachably securing the sleeve 31 and is shown in FIG. 7. This includes the provision of a relatively coarse thread 38, preferably of the Acme type formed on the interior of the sleeve 31. Corresponding threads 39 are provided on the outer surfaces of the collets 27, it being understood that the threads 39 on the two collets 27 align with one another when the collets are assembled correctly upon the cylinder. These threads are shown in phantom on one side of the collet half illustrated in FIG. 3.

The sleeve is screwthreadably engageable upon the collet after they have been engaged around the cylinder, and is tightened into position by means of a wrench (not illustrated).

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim is:

1. A cylinder construction for use with hydraulics and the like which includes at least one fluid port therein; comprising in combination a central hollow cylinder, an end portion for each end of said cylinder, each of said end portions having a shoulder engageable within the ends of said cylinder, sealing means between said shoulders and the inner surface of said ends of said cylinder and means to detachably secure said end portions to said cylinder, said last mentioned means including an annular groove formed around the outer surface of said end portion and an annular groove formed around the outer surface of said cylinder adjacent to but spaced from the end thereof, a split collet assembly engageable with said grooves and spanning the junction between said end portion and the end of said cylinder and means to detachably retain said collets in position, each of said collets including an annular spanning portion and inturned annular flanges one on each side of said spanning portion, one of said flanges engaging within said annular groove in said cylinder, the other of said flanges engaging within said annular groove in said end portion, said means detachably retain said collets in position including a sleeve engaging over said end portion and frictionally engaging the outer surfaces of said collets, said sleeve having an inner end and an outer end, and annular inturned flange on said outer end thereof, engaging with the said other annular flange of said collet to position said sleeve upon said collets.

* * * * *